United States Patent
Iwanejko

(10) Patent No.: US 10,232,989 B2
(45) Date of Patent: Mar. 19, 2019

(54) SPOUT WITH LIQUID DISPENSING VALVE

(71) Applicant: IWANEJKO ELECTRONICS—Zdzislaw Iwanejko, Warsaw (PL)

(72) Inventor: Zdzislaw Iwanejko, Warsaw (PL)

(73) Assignee: IWANEJKO ELECTRONICS—Zdzislaw Iwanejko, Warsaw (PL)

( * ) Notice: Subject to any disclaimer, the term of this patent is extended or adjusted under 35 U.S.C. 154(b) by 2 days.

(21) Appl. No.: 15/509,908

(22) PCT Filed: Sep. 12, 2014

(86) PCT No.: PCT/IB2014/001834
§ 371 (c)(1),
(2) Date: Mar. 9, 2017

(87) PCT Pub. No.: WO2016/038409
PCT Pub. Date: Mar. 17, 2016

(65) Prior Publication Data
US 2017/0297782 A1   Oct. 19, 2017

(51) Int. Cl.
*B65D 47/28*   (2006.01)
*B67D 7/00*    (2010.01)
(Continued)

(52) U.S. Cl.
CPC .......... *B65D 47/283* (2013.01); *B65D 55/02* (2013.01); *B67D 7/005* (2013.01); *B67D 7/42* (2013.01); *F16K 35/025* (2013.01)

(58) Field of Classification Search
CPC .. B65D 47/061; B65D 47/063; B65D 47/283; B65D 55/02; B67D 3/045; F16K 35/025
See application file for complete search history.

(56) References Cited

U.S. PATENT DOCUMENTS

| | | | | |
|---|---|---|---|---|
| 1,596,816 | A | * | 8/1926 | Dorff ...................... B67D 3/045 |
| | | | | 417/496 |
| 2,207,816 | A | * | 7/1940 | Packer ................. B65D 47/283 |
| | | | | 222/482 |

(Continued)

FOREIGN PATENT DOCUMENTS

| | | | |
|---|---|---|---|
| CN | 201091743 Y | 7/2008 | ............ A61M 39/22 |
| EP | 0 803 235 A1 | 10/1997 | ............... A61F 5/44 |

(Continued)

OTHER PUBLICATIONS

International Search Report dated May 13, 2015 in corresponding application No. PCT/IB2014/001834.

(Continued)

*Primary Examiner* — Paul R Durand
*Assistant Examiner* — Bob Zadeh
(74) *Attorney, Agent, or Firm* — Renner Kenner Greive Bobak Taylor & Weber

(57) ABSTRACT

A device for filling or discharging a liquid includes an elongated body, a coaxial closure sleeve mounted axially on the main sleeve, wherein the main sleeve is slidable relative to the closure sleeve and the body and comprises an outlet end on its side remote from the body and an inlet end on the side closer to the body, facing the liquid inlet, at the inlet side the main sleeve has lateral surface outflow openings, a push-button for actuating the liquid outflow located at the outflow end of the device, located on the main sleeve at its outlet end side, which the push-button is non-rotatably mounted thereon, and between the main sleeve and the closure sleeve a sealing diaphragm, as well as the helical spring of the push-button are arranged. The liquid flows by axially displacing the push-button member.

13 Claims, 10 Drawing Sheets

(51) Int. Cl.
  *B67D 7/42* (2010.01)
  *B65D 55/02* (2006.01)
  *F16K 35/02* (2006.01)

(56) References Cited

U.S. PATENT DOCUMENTS

| | | | | |
|---|---|---|---|---|
| 2,661,018 A | * | 12/1953 | Snyder | B67D 3/046 137/588 |
| 2,799,471 A | * | 7/1957 | Maroney | F16K 31/58 222/518 |
| 3,052,382 A | * | 9/1962 | Gawthrop | B65D 83/54 222/335 |
| 5,535,794 A | * | 7/1996 | Posly | B66F 9/06 141/351 |
| 2012/0145748 A1 | * | 6/2012 | Yoon | A47K 5/1211 222/390 |

FOREIGN PATENT DOCUMENTS

| | | | | |
|---|---|---|---|---|
| FR | 2 619 612 | | 2/1989 | ............. F16K 21/04 |
| WO | WO 2010/143018 A1 | | 12/2010 | ............... F16K 3/00 |

OTHER PUBLICATIONS

Written Opinion dated May 13, 2015 in corresponding application PCT/IB2014/001834.

* cited by examiner

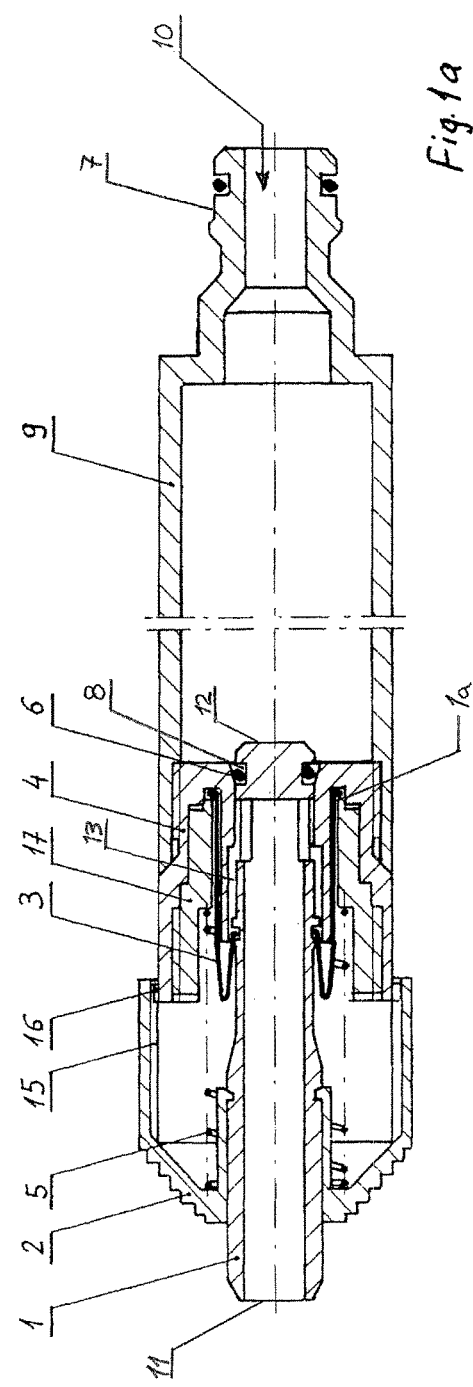
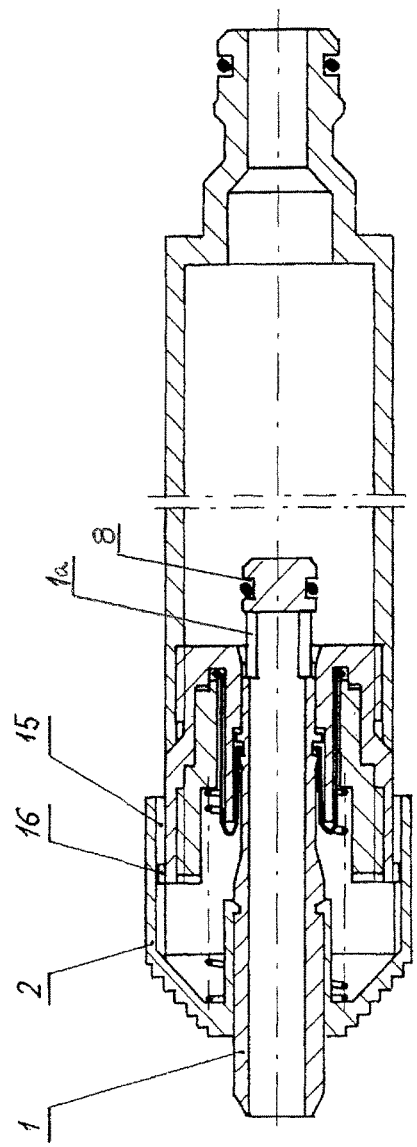
Fig. 1a
Fig. 1b

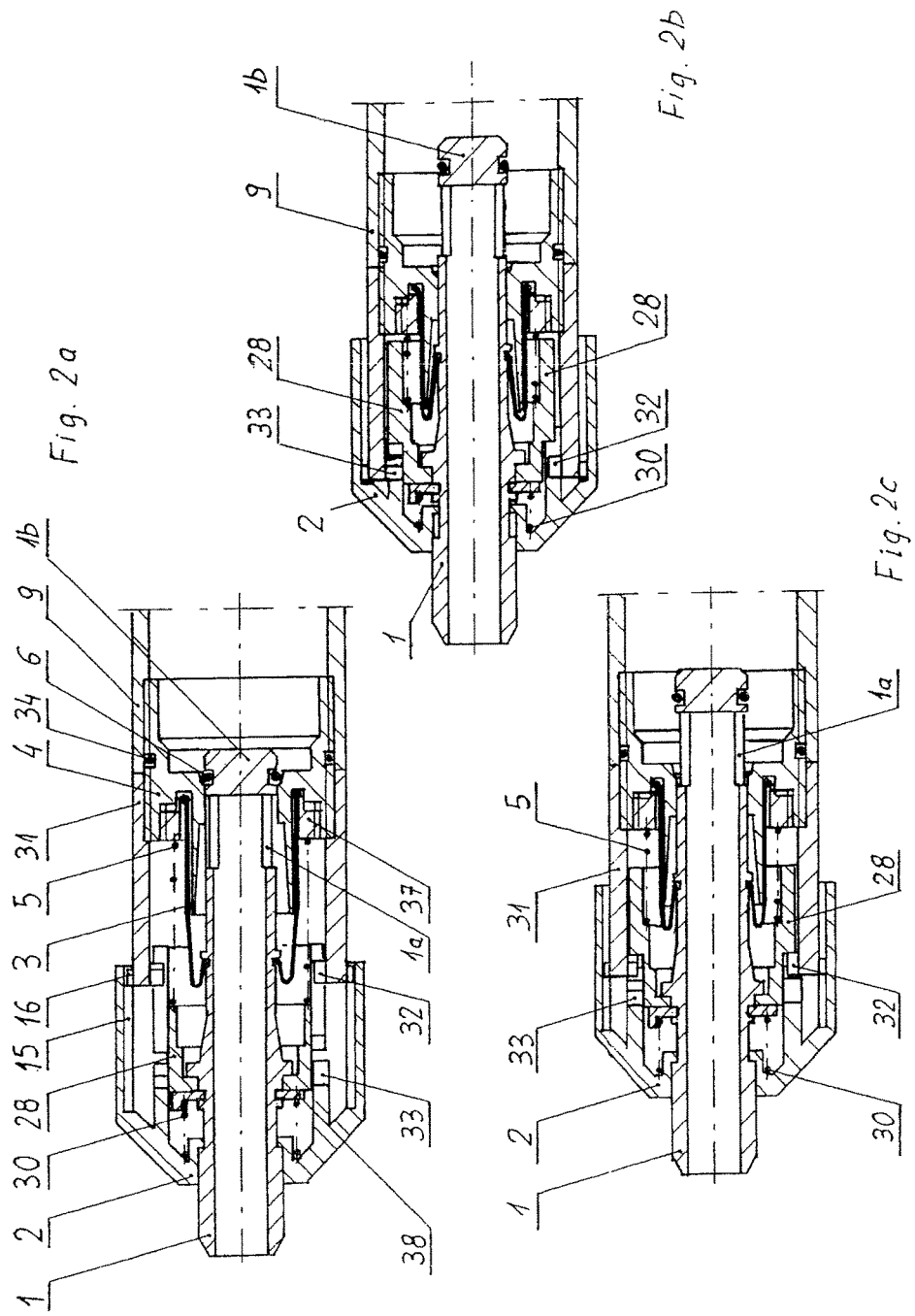

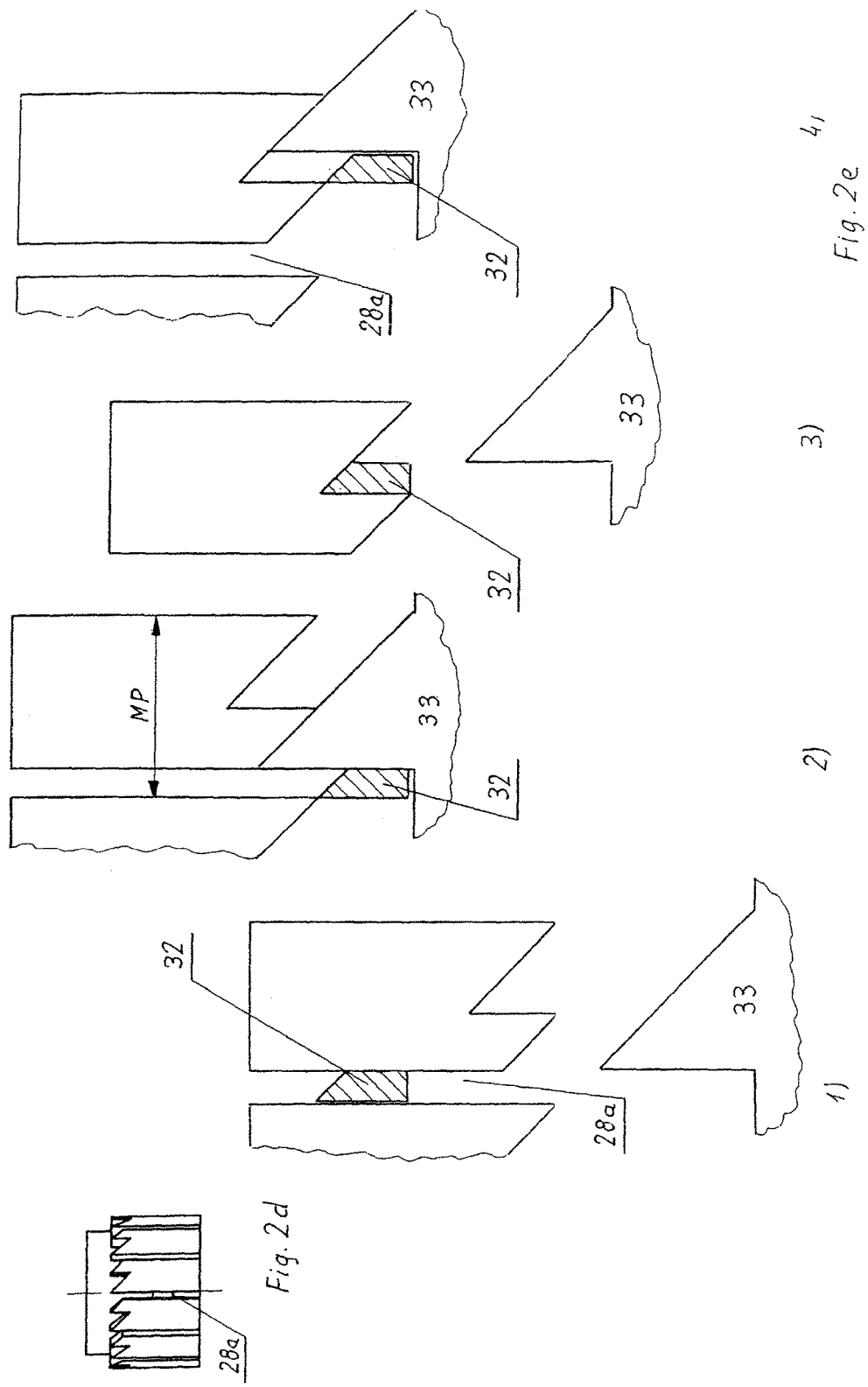

SPOUT WITH LIQUID DISPENSING VALVE

CROSS-REFERENCE TO RELATED APPLICATION

This is a § 371 application of International Patent Application No. PCT/IB2014/001834, filed Sep. 12, 2014, and which is incorporated herein by reference.

TECHNICAL FIELD

The object of the present invention is a device for pouring in or pouring out a liquid and particularly for filling or emptying liquid, said device is provided with a valve for manual actuating of a flow, especially using only one hand, from the installation terminated with flexible pipe or hose, in particular for dispensing, filling and/or emptying liquid into and/or from containers, including storage containers, especially when using flexible pipe or hose, the device providing ergonomic setting of the open valve position with the optional possibility of easy to handle locking thereof in the open flow position and releasing it from this position to the closed position using only one hand.

BACKGROUND ART

There are known manual devices provided with valves for dispensing water or other different liquids from larger containers or from supplying installations, for example from water installations, which devices are installed at one end of the flexible pipe, typically a flexible hose, the other end of which is connected to the emptied container or to said installation.

Such manually operated devices for pouring in, for example are widely used for irrigation of plants in horticulture and they are generally provided with a hand grip being provided with a port or connection for supplying a liquid at one side and a dispensing nozzle at the other side, and also with the button similar to a gun trigger for closing and opening of the flow. Typically, this type of pistol type devices are provided with a valve openable with the trigger button which, when pressed with a hand, opens the dispensing valve. However, in order to lock the valve in the open position or to unlock it from the open position it is necessary to use a second hand. Additionally such constructions are quite complicated to manufacture and typically have a relatively large size.

One of the known solutions relatively convenient for being operated with one hand is the One Touch Shower & Stream type device of Dramm Corporation intended for connection to a flexible pipe and provided with a slide valve and an adjustable nozzle. Both opening and closing of the slide valve and also an adjustment of its opening degree is performed by moving the operating slider by means of simple movement of the thumb on the upper side of the device housing made of a plastic material, which housing is in the form of a comfortable hand grip. The drawback in operating the device using only one hand results from the fact that it requires performing two movements of the thumb, the first one—repulsive movement, pushing the slider away and the second one—pulling movement, pulling the slider towards oneself. While the pressure of the thumb in the direction of a pulling movement is natural and effortless movement, the pushing movement in the opposite direction is not very ergonomic and requires more concentration and effort. A similar device has launched Gardena Company. Opening and closing of the flow is performed by moving the lever with the thumb in the right direction.

It is known from EP0803235 one-piece valve for urostomy pouches, that is simple to manufacture and user-friendly when operated with one hand, said valve made of natural rubber or flexible plastic, and consisting of a substantially flat base, which is adhesively attached to a wall of an urostomy pouch, having a liquid inlet opening and an outlet nozzle and with a protruding wall extending at a distance from the peripheral edge, wherein the base has a resiliently deformable cover, snap-fixed on a protruding wall, said cover is provided on its internal side with a protruding portion, preferably perpendicular to the base, constituting the button and with a centrally disposed plug at the side facing the base and projecting towards the liquid inlet opening, tightly closing this opening. The protruding portion of the cover can be pushed towards the base in order to remove the plug from the liquid inlet opening and to open this liquid inlet opening allowing fluid to flow out through the disposing nozzle. After repeated pressing the button the plug of the resilient cover closes tightly the inlet opening of the base. Such a type of valve for urostomy pouch can be operated with one finger, but it is only suitable for use when mounted on a wall of the pouch, as it does not constitute a stand-alone device in use.

Utility Model CN 201091743 discloses a valve for draining liquid from the drainage bag for medical use, which valve is provided with a liquid inlet at one end and a liquid outlet at the other end, while in the middle portion of the valve body a transverse tube is arranged which is embedded in the valve body and traversing its cross-section in such a manner, that the inner space of the transverse tube is in flow communication with the inlet and outlet and accommodates a sliding plunger, dimensionally adapted to its shape. The sliding plunger has a circular groove shaped in accordance with the valve inlet and outlet, wherein when pressing the plunger towards one end, the sliding circular groove opens a fluid connection between the valve inlet and outlet, while when the plunger slides in the second direction the connection between the inlet and the outlet becomes closed. The valve can be operated with one hand, wherein it is gripped with the index and middle finger, and the sliding plunger is slid with the thumb to open and close the valve in the suitable opposite directions, there is also no possibility to block the valve in the open position.

The Task and Purpose of the Invention

There is a need for further improvements of the structure of the filling devices, in particular provided with a valve for emptying containers or for filling/emptying liquid, which would be autonomous devices, ensuring the possibility to be used in a wide range for pouring in/pouring out liquids, dispensing liquids and for filling and emptying containers of various kinds, or for feeding smaller containers from collective packaging or from installation terminated with a flexible conduit, preferably a hose, with the possibility to effort-free and ergonomic operating them with one hand.

This task is solved according to the invention by a valve type structure of a device for filling or emptying according to the attached claims, in which device the flow opening and closing operation is carried out by means of one finger with the use of a movement in one and the same direction, which direction is the direction of pushing a button with the thumb and in which device additionally optional capability for automatically locking the device in the open flow position and in the closed flow position is provided, as well as also releasing the lock by means of the same movement in one direction, without the need for additional movements and manipulation.

The pouring device according to the invention is very ergonomic to operate because a simple pushing movement is required for opening the valve of the device and starting the flow, while releasing pressure is sufficient for closing the flow. In the optional version there is possibility to lock the device in the open position, while for its releasing and closing flow it is sufficient to press again a button with the thumb, similar to turn on and off the ball pen, which movement is natural motion, not requiring effort and convenient even for people with limited manual activity, including for people with disabilities.

The solution according to the invention in a preferred, first embodiment ensures opening the pouring device for filling, i.e. opening the flow of liquid, and especially its valve, only when the button is pressed, wherein after releasing the button the device returns to the closed position or in an optional second embodiment it is retracted and locked in the closed position after the button is pressed again to release the lock of the open flow position, i.e. of the pressed button.

The present invention allows for easy to operate dispensing of a liquid, even with an accuracy of individual droplets with the proposed valve-type pouring device for filling or discharging liquid which is rearranged to the open flow position by exerting only a light pressure (pushing), preferably with the thumb, on the push-button member, in the axial direction from the outlet of the device in the direction towards the liquid inlet, to which the feeding of the dispensed liquid is connected, preferably a liquid supplying stub pipe, wherein the same axial pressing which causes axial displacement of the push-member in the direction towards the inlet, in an optional embodiment, also causes blocking and positioning of the device in the open position, while the next pressing on the push-member in the same axial direction towards the inlet in optional embodiment causes releasing of the locking mechanism and automatic returning of the device to the closed flow position.

The device according to the invention is operated at low supply pressures, particularly at pressures typical for water-pipe supply network or lower pressures.

The device according to the invention is suitable in addition for using as a standard hose dispensing nozzle, particularly preferably for use to pouring in and filling and dispensing liquid from the doypack type package. Additionally, a dispensing nozzle provided with a thread, bayonet mechanism or the like mechanism may be located at the outlet end of the device for attachment of extra fittings or dispensing nozzles.

Furthermore, the push-button can be provided with grooves or another notches or protruding bulges to facilitate its manual sliding, which are preferably arranged transversely, and at least one of said push-button surfaces is oriented at an angle, preferably oblique or perpendicular to the shifting direction, that is the direction of pushing the button during opening and closing of the flow through the device.

The device according to the invention ensures an excellent tightness of connections and a high operation reliability both during flow opening and its blocking in the flow opening and closing positions and in the closed position.

The tightness of the device according to the invention is improved in comparison to known pouring devices for filling and dispensing liquids, which typically have a structure of the releasing means, i.e. flow opening means acting on a lever mechanism principle, i.e. performing rotary-tilting motion, which mechanism is difficult to seal. In the device according to the invention the releasing means has the structure acting on a principle of sliding motion (reciprocating), which is easier to be effectively sealed.

SUMMARY OF THE INVENTION

A pouring device for filling or discharging liquids according to the invention comprises an elongated body, preferably cylindrical, at one end terminated with a tip for a supply stub pipe, which is forming the liquid inlet and defining an inlet end of the device, a closure sleeve, which is arranged co-axially relative to the device body and is supported axially on the main sleeve in such manner that it surrounds the latter with a clearance, wherein the main sleeve is slidable relative to the closure sleeve and the device body and it comprises an outlet end at its side remote from the device body and an inlet end at the side directed to the device body, facing towards the liquid inlet, wherein the main sleeve has on its side surface, at the side of its inlet end, at least one, and preferably at least two, outflow openings or more outflow openings, and further a circumferential groove with the gasket is provided around the side surface of the main sleeve, while a member for activating and shutting off the liquid outflow from the pouring device is located at the outlet discharging end of the device.

According to the invention the device is characterized in that the member for activating the flow has a form of a pressing button in the form of the push-button located on the main tube at its outlet end side, the button is non-rotatably mounted thereon, and between the main sleeve and the closure sleeve the sealing, preferably in the form of a rolling diaphragm, as well as helical spring of the button are arranged, wherein the device is transposed to the open flow position by exerting pressure on the push-button member applied in the axial direction from the outlet side in the direction towards the inlet of the device and the axial displacement of the push-button member together with the main sleeve towards the inlet, to a position, in which the outflow openings slide out beyond the closure sleeve and the gasket, wherein, after releasing pressure on the push-button element, the main sleeve, and thus the whole device, automatically returns to the closed flow position as a result of the return movement of the main sleeve to a sealed position by the gasket in the closure sleeve under the action of the push-button spring.

According to the invention, preferably, a protection is provided against rotation of the button with respect to the structural unit, composed of: the device body, the closure sleeve and the rolling diaphragm, by means of cooperation of a guiding protrusion located on the surface of the closure sleeve or the device body and guiding groove disposed, preferably, on the inner surface of the push-button.

Additionally, in the preferred embodiment of the invention, a locking mechanism is provided for locking the device in the opening flow position of a liquid from the inlet to the outlet of the device, wherein the locking mechanism is in the form of a plug-socket coupling mechanism with a plug unit and socket unit, which units are respectively provided with locking protrusions or teeth which are adapted in shape to cooperate with each other and arranged respectively on each of those units, wherein the socket unit includes a crown with teeth, and the plug unit comprises locking tabs or protrusions forming either structural components, or auxiliary elements of the unit. Alternatively, the locking mechanism is in the form of a cam-slider coupling mechanism provided with a guiding cam member in the form of a recess or shaped groove and the guided member in the form of a slider or a resilient element both adapted in shape to cooperate with the guiding member.

In a preferred embodiment of the invention the device locking mechanism in the form of a plug-socket coupling mechanism includes a plug unit with the locking protrusions in the form of one or more structural elements selected from the following: latching protrusions of the latching sleeve, latching protrusion of the latching sleeve, toothlike protrusions of the push-button or its toothed flange and/or pusher protrusions or toothed flange of the main sleeve and cooperating with said plug unit the socket unit having toothlike parts or teeth, wherein the socket unit includes a crown provided with protrusions in the shape of crown teeth or toothlike portions of the crown, which are adapted to cooperate, as well as adapted in shape and dimensions for entering into locking engagement with respective latching protrusions, and with toothed protrusions and/or pusher Protrusions as auxiliary elements of the plug unit, preferably in the form of auxiliary toothlike protrusions that are arranged on an inner surface of the push-button member or in the form of auxiliary pusher protrusions arranged on the main sleeve.

In a preferred alternative embodiment of the invention, the device locking mechanism in the form of a cam-slider coupling mechanism comprises: a guiding element in the form of a cam made as a cam recess or a shaped groove, manufactured as a groove on the inner surface of the push-button member or as a shaped groove, preferably of cardioids shape in a sleeve, mounted inside the device body, and Cooperating with said groove as a guided element, a sliding element in the form of: a sleeve slider of the sleeve arranged inside the device body; a slider or a resilient member on the main sleeve; or the guide protrusion, respectively, wherein, preferably, the shaped groove includes a portion forming the guiding groove.

In a preferred further embodiment of the invention the device comprises a guiding groove disposed on the inner side surface of said push-button member, whereas cooperating with it guiding protrusion is disposed on the outer surface of the device body or of an element joint to the device body and has a width smaller than the width of the guiding groove, and further preferably, the ratio of the inner circumference dimension of the cylindrical portion of the push-button to the width of the guiding protrusion is greater than 40, and preferably greater than 120.

In a further preferred embodiment of the device according to the invention a lighting element, preferably a LED, connected to a supplying battery is provided at that side of the inlet end of the main sleeve which is directed towards the device inlet, whereas in the device body a resilient contact is placed with a pusher biasing the pusher spring in the direction towards the inlet when the main sleeve is moved by sliding outside from the closure sleeve, after pressing the push-button member in the direction towards the inlet and opening the flow between the inlet of the device and the outlet of the main sleeve, which pusher causes simultaneously pressing the spring contact against the battery and closing the electric circuit thus causing emission of light by the LED, wherein the light beam is guided by an outflow stream of a liquid and it illuminates the place to which the liquid flows.

DESCRIPTION OF THE DRAWINGS

The object of the invention is shown in the embodiments in the figures of drawings, in which FIG. 1a, 1b show an axial section of the first embodiment of the invention in the open flow and closed flow position, FIG. 2a-2c—an axial section of the second embodiment of the invention in the open flow and closed flow positions, FIG. 2d-2e—details of the second embodiment of the invention, schematically;

DESCRIPTION OF THE EMBODIMENTS OF THE INVENTION

Figure 3A:
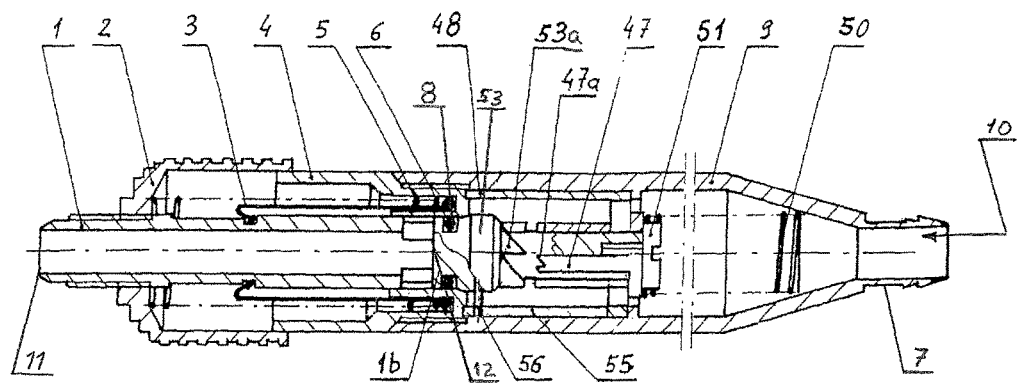
FIG. 3a-3b—an axial section of the third embodiment of the invention in the open flow and closed flow positions, FIG. 4a-4b—an axial section of the fourth embodiment of the invention in the open flow and closed flow positions, FIG. 4c-4d—an axial section of the fifth embodiment of the invention in the open flow and closed flow positions, 4e—details of the fifth embodiment of the invention in an exploded perspective view, FIG. 4f-4g—details of a cam-slider locking assembly in a fourth and fifth embodiment of the present invention, schematically, FIG. 5a-5b—an axial section view of the sixth embodiment of the invention in the open flow and closed flow positions, FIG. 6a-6b—an axial section of the seventh embodiment of the invention in the open flow and closed flow positions, FIG. 6c—details of a cam-slider locking assembly in a seventh embodiment of the present invention, schematically, and FIG. 7a-7b—an axial section of the eighth embodiment of the invention in the open flow and closed flow positions.

Successive preferred embodiments of the invention are shown in the FIG. 1a-7b, wherein similar or identical constructional elements in the figures of the drawings are designated by the same reference numerals.

The valve pouring device according to the invention in a preferred embodiment, as shown in FIG. 1a, 1b, comprises an elongated body 9, preferably cylindrical, terminated with a tip 7 at one end in the form of a connection port, a stub pipe etc. for connecting a flexible hose, and forming a liquid inlet 10. At the other end, into the body 9 extends a closure sleeve 4 mounted fixedly in the body 9, inside which a closure sleeve 4 the main sleeve 1 is arranged, wherein the main sleeve 1 is slidable relative to the closure sleeve 4 and the device body 9. The main sleeve 1 has an outlet end 11 and an inlet end 12, facing towards the liquid inlet 10 and closed with a closure element 1b, wherein on the side surface at its inlet end 12, placed in the body 9 and facing the liquid inlet 10, it is provided with at least one, and preferably at least two outflow openings 1a, followed, in the direction of the inlet end 12, by a circumferential gasket groove 8, arranged on side surface of the main sleeve 1 and provided with a gasket 6. Between the main sleeve 1 and the closure sleeve 4, a sealing, in a preferred embodiment in the form of a sealing diaphragm 3, preferably a rolling diaphragm 3 and also a helical spring 5 of a push-button 2 are arranged. The sealing diaphragm 3 is mounted at one side in the recess of the closure sleeve 4 and secured against falling out with a pressure bushing 17, and on the other, opposite side it is mounted in a groove, formed in the main sleeve 1. The pressure bushing 17 biases the rolling diaphragm 3 in order to ensure proper sealing. On the main sleeve 1, at the second end side thereof, i.e. the outlet end 11 thereof, the push-button 2 is non-rotatably mounted to start and shut off the liquid outflow from the device, being the push-button 2 in the form of the push-button 2, which may be hollow, as shown in FIG. 1a, b. Protection of the push-button 2 against rotation in relation to the structural unit, composed of the device's elongated body 9, the closure sleeve 4 and the rolling diaphragm 3, is performed by cooperation of the guiding protrusion 16, arranged on the side surface of the closure sleeve 4 and the guiding groove 15, disposed on the inner surface of the push-button 2. A purpose of the protection of the main sleeve 1 against rotation in relation to the closure sleeve 4 is to avoid twisting of the rolling diaphragm 3.

The device according to the invention functions in such a way that the liquid flow from the inlet to the outlet is opened by means of pressing the push-button 2 and moving it towards the inlet, which button 2 is non-rotatably mounted on the main sleeve 1. This moves the main sleeve 1 in the same direction until its outflow openings or outflow opening 1*a* are slid out from the closure sleeve 4 from the position sealed by the gasket 6 and the rolling diaphragm 3, and the fluid communication between the body 9 and the main sleeve 1 is opened, thus the communication between the liquid inlet 10 and outlet of the device, i.e. between the inlet end 12 and outlet end 11 of the device is opened. After releasing pressure on the push-button 2 closing of the flow takes place automatically under the action of the spring 5 of the push-button 2 and the pressure of the liquid as well. Gasket 6 on the main sleeve 1 positions the main sleeve 1 in a rest position in which the gasket 6, preferably O-ring, is located inside the closure sleeve 4, in its axial hole, at its end made in the form of an internal conical end surface of the closure sleeve 4, wherein the seal 6 abuts against the conical portion of the closure sleeve 4 while providing a seal.

A second preferred embodiment of the device for pouring in or discharging (pouring out) according to the invention is shown in FIGS. 2*a*, 2*b* and 2*c*, wherein for similar or the same structural elements the same reference numerals are appointed as in FIG. 1*a, b*. The device in this embodiment comprises structural components that are similar in structure and functions and are similarly positioned as in the embodiment shown in FIG. 1*a, b*, that is: the elongated body 9, the push-button 2 with the button spring 5, the closure sleeve 4, the gasket 6, the main sleeve 1 with outflow openings 1*a* and the closure element 1*b* and the sealing in the form of the rolling diaphragm 3.

Additionally, in this embodiment of the device, it is provided the locking of the main sleeve 1 in the open flow position. Locking of the main sleeve 1 in the open flow position, i.e. after pushing in the push-button 2 in the axial direction towards the liquid inlet 10, similar as shown in FIG. 1*a, b*, is realized by means of the locking mechanism of the plug-socket type coupling mechanism, which in this embodiment includes a crown 28, forming a socket unit, provided with the oblique teeth, which crown is rotatably mounted on the main sleeve 1, in the section of the main sleeve 1 arranged in the inner space limited by a substantially cylindrical internal wall of the push-button 2, by means of a retaining ring 38, wherein said crown 28 cooperates with the latching sleeve 31 having a latching protrusion 32 which are the part of the plug unit of the locking mechanism, in which sleeve 31 the closure sleeve 4 is positioned, wherein in one variant of the invention, the latching sleeve 31 and closure sleeve 4 may form one element or may be integrated with each other. The oblique teeth of the crown 28 are in the form of two side-by-side interconnected teeth, wider and narrower, forming a single toothed portion of the crown 28. In the open flow position, the crown 28 maintains the main sleeve 1 in such manner that the outflow openings 1*a* are shifted outside, beyond the closure sleeve 4 to allow free flow of liquid between the inlet and outlet of the device, in cooperation with the catch 32 forming a part of a latching sleeve 31. The latching sleeve 31 is in turn interposed between the device body 9 and the push-button 2 and surrounds from the outside one end of the closure sleeve 4, arranged inside it, the second end of which is arranged inside the body 9, wherein the catch 32 forms the latching protrusion 32 that protrudes inwardly from the inside surface of the latching sleeve 31 and has its end, facing the closure sleeve 4, terminated with an angled chamfer having an angle close to the angle of inclination of the oblique teeth of the crown 28, wherein the crown 28 is provided with wider and narrower teeth.

The push-button 2 is snap-fitted with a slight play on the main sleeve 1, in relation to which it thus has capability of limited slide and very limited rotation.

The push-button 2 is further provided with inner oblique teethlike protrusions 33, directed axially with respect to the main sleeve 1, which are the auxiliary constructional components of the plug unit of the locking mechanism.

The push-button 2 is in the free position, that is without any pressure, moved away from the crown 28 by means of an additional spring 30.

After pushing in the push-button 2 the oblique toothlike protrusions 33 pressing the oblique teeth of the crown 28, that is its toothed parts, cause its axial displacement, allowing the exit of the latch 32 from the slot 28*a*, and then turning the crown 28 until the side wall of the slot 28*a* abuts against the side of the toothlike protrusion 33. After releasing the pressure on the push-button 2 the additional spring 30 pushes the button away from the crown 28, moving away toothlike protrusions 33 to allow further rotation of the crown 28 until the catch 32 abuts against the side of the next tooth of the crown 28 and locks the crown 28 in this position.

After pressing again the push-button 2, oblique toothlike protrusions 33 cause, by pressing the oblique teeth of the crown 28, that is the toothed parts of the crown, its axial displacement, to allow releasing the engagement of the oblique teeth of the crown 28 from the catch 32 of the latching sleeve 31, and then turning the crown 28 around by an angle preventing their return to the previous position, in practice that is the angle corresponding to the ratio of the circumferential dimension, that is, the width of the narrower toothed portion of the crown 28 to the circumference dimension of the crown 28 and releasing it from the locked position. Depending on the size and the angle of inclination of the oblique engagement surfaces of the coupling, an angle of the single rotation of the crown 28 is in the range from 1 degree to 45 degrees, more preferably from 2 to 15 degrees, and in particular 3 to 9 degrees.

Releasing the locked position, in turn, causes as a return movement of the main sleeve 1 in the direction towards the outlet (in FIG. 2*b* to the left) under the action of the spring 5 and the liquid pressure and closing the outflow openings 1*a* inside the closure sleeve 4. A structure of the crown 28 is shown in more detailed manner in FIG. 2*d*, and the working principle of the locking mechanism in this embodiment is explained schematically in FIG. 2*e*, which shows the consecutive working positions 1-4 explained below:

Position 1—in this position oblique toothlike protrusions 33 are spaced apart from the crown 28 and the catch 32 is in the slot 28*a* of the crown;

Position 2—in this position oblique toothlike protrusions 33 press on oblique, narrower teeth of the crown 28 causing its movement in the direction of the closure sleeve 4, while the catch 32 is still in the slot of the crown 28 and does not allow for its rotation. The slot having a width not less than the width of the catch 32, separates consecutive modules consisting of a wider and a narrower tooth of the crown 28, that form toothed parts of the crown 28. In the final moment, the catch 32 will be on the outside of the crown 28 and the component force resulting from the action of oblique toothlike protrusions 33 on the oblique, narrower teeth of the crown 28 will cause rotation of the latter, until abutment of the longer side of the slot against a perpendicular part of oblique toothlike protrusions 33;

Position 3—after releasing the pressure on the push-button 2 the oblique wider teeth of the crown 28 will engage the oblique part of the catch 32 and the component force will cause rotation of the crown 28 until abutting against the side part of the catch 32 and retaining the crown 28 in this position, and at the same time stopping the main sleeve 1 in this position. This is the position in which the flow is open;

Position 4—next pressing the push-button 2 results in pushing of the oblique toothlike protrusions 33 of the push-button 2 to the oblique wider teeth of the crown 28, causing it to move in the direction of the closure sleeve 4, wherein the side of the catch 32 still locks the crown 28 and prevents its rotation. In the final moment, the catch 32 will be on the outside of the crown 28, that is the crown 28 will be beyond of the catch 32, and the component force resulting from the action of oblique toothlike protrusions 33 on the oblique, wider teeth of the crown 28 will cause its rotation, until abutment of the side surfaces of the narrower teeth of the crown 28 against the perpendicular part of oblique toothlike protrusions 33. After releasing the pressure on the button 2, the oblique narrower teeth of the crown 28 will hit an oblique portion of the catch 32 and the component force will cause rotation of the crown 28, until its abutment against the side part of the catch 32, in which position the catch 32 will engage into the slot 28a of the crown 28, and the crown 28 will be able to perform a freely slide movement, that is, the return movement thereof up to the point in which the gasket 6 abuts against the closure sleeve 4, i.e. against the inner surface of the closure sleeve 4. In this position, the flow is stopped.

In FIG. 2d an indexing module MP is indicated, which means the distance between two adjacent teeth sets of the crown 28 forming toothed parts thereof.

The utilization of the rolling diaphragm 3 as the sealing between the main sleeve 1 and the closure sleeve 4 provides a reliable sealing of the device against the outflow of the filled liquid, and at the same time does not cause a large motion resistance during sliding of both sleeves relative to each other, which allows easy opening and closing of the flow without excessive effort of the operator, with only one hand.

In the next variant of the above described embodiment with reference to FIG. 2a-2e, on the main sleeve 1, the push-button 2 is slidably mounted having the side wall similar to the cylinder with the toothed flange attached inside or duly integral with the push-button. The toothed flange is provided with toothed, triangular in shape protrusions, with an angle of inclination in the range of 30°-60°, preferably 45°. The crown 28 is slidably and rotatably arranged on the main sleeve 1 and forms a socket unit of the coupling mechanism, having spatially distributed triangular protrusions forming the teeth having the profile matching the shape of protrusions of the toothed flange, wherein the spacing pitch of the toothed protrusions on the toothed flange is equal to or it is an integral multiple of the module MP of distribution of protrusions on the crown 28. The protrusions of the crown 28, as shown in detail in the embodiment in FIG. 2d, are composed of segments, each of which has one triangular recess with a width of about ½ of the module MP (pitch) and the second triangular recess with a width of approximately ⅓ of the module MP (pitch). The slot with a width approximately ⅙ of the MP pitch is provided between individual segments. The crown. 28 cooperates by engagement with the latching protrusions 32 or catches 32 of the latching sleeve 31 causing after each pressing on the push-button 2, alternating, either blocking the main sleeve 1 in an offset position, that is in the open flow position, or releasing of the main sleeve 1 and its returning shifting movement up to the closed flow position. The next movements during cooperation of toothed protrusions 33 of the toothed flange of the push-button 2 with the crown and the catch 32 are shown in FIG. 2e, as explained above. In the case of this variant of the invention, FIG. 2e shows respectively:

1. Resting position;
2. The toothlike protrusion 33 moves the crown to the point where the catch 32 slides out of the slot 28a, and the distribution of forces results in turning of the crown up to the abutment against the side of the catch 32;
3. After releasing the push-button, the crown abuts against the catch 32 and slides on it until stabilizing the position in the recess;
4. After the following next pressing the push-button, the toothlike protrusion 33 moves the crown to the point where the catch 32 slides out from the triangular recess having a width of about ½ of the MP pitch, and the distribution of forces results in turning of the crown around, up to the abutment against the side of the toothlike protrusion 33, while after releasing the pressure, the crown rotates yet about ⅙ of the (MP) pitch, until the catch 32 will come to the location opposite the slot of the crown, allowing the free movement of the crown up to the point where the gasket 6 of the main sleeve 1 will stop it, leaning against the closure sleeve 4.

In each successive pressing and releasing cycle the crown rotates by an angle corresponding to approximately ½ of the module MP (pitch).

The catch 32 has a width smaller than the width of the slot 28a of the crown 28 to slide freely.

The height of the toothlike protrusion 33 is greater than the sum of the height of the catch 32 and the depth of the recess of the wider teeth of the crown.

Figure 3B:
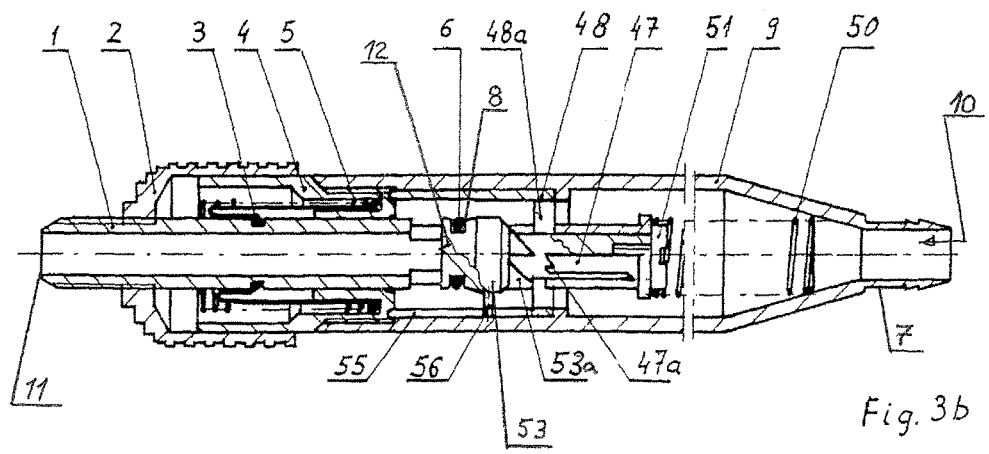

The pouring device of the invention in the following third, embodiment is shown in FIG. 3a, 3b, wherein all of similar or the same structural components as in the embodiment shown in FIGS. 1a-b and 2a-e, are indicated with the same reference numbers. In relation to the embodiment shown in FIG. 1a, b the pouring device in this embodiment is further provided with a locking mechanism, wherein, the device similarly to FIG. 1a, b comprises elongated body 9, preferably cylindrical, terminated at one end with a conically tapered portion with the tip 7 in the form of connection port, stub pipe, etc. for the elastic hose, forming a liquid inlet 10 inside which part the spring 50 is arranged. The locking mechanism in this embodiment preferably comprises a sleeve of the crown 47 with the teeth 47a of the locking mechanism, forming together the socket part of the locking mechanism, similar structurally to the crown 28 shown in FIG. 2d, which crown 47 cooperating with a plurality of protrusions 53a of a pusher 53, located on the main sleeve 1, which constitute auxiliary structural components of the plug unit of the locking mechanism. In the preferred embodiment, the plurality of protrusions 53a may be in the form of a toothed flange. At the other side, the closure sleeve 4 is inserted into the body 9 and secured therein, for example, forcedly fitted, or by means of a threaded connection, and which closure sleeve 4 is mounted on the main sleeve 1 and surrounds with a clearance 13 the main sleeve 1, wherein the main sleeve 1 is slidable with respect to the closure sleeve and the body 9. The main sleeve 1 has an outlet end 11 being the outlet of the device and an inlet end 12 closed with the closure element 1b, facing towards the liquid inlet that is towards liquid supply, wherein on the side surface of the main sleeve 1 close to its inlet end 12, facing the body 9 and liquid inlet 10, at least one, and preferably at least two outflow openings 1a are provided, following which in the direction of the inlet end 12 of the main sleeve 1 on its side surface, a circumferential gasket groove 8 is provided with a gasket 6. Further, on the inlet end 12 of the main sleeve 1 facing towards the liquid inlet the protrusions of the pusher 53 are provided, which are constructional components of the locking mechanism and form the plug unit of the coupling mechanism, preferably the protrusions are triangular in shape and with an angle of inclination 30-60 degrees, preferably approximately 45 degrees.

On the inlet end 12 side of the main sleeve 1, a bushing with a crown 47 of the locking mechanism is slidably and rotatably mounted having crown teeth and a crown fixing screw 51, which prevents sliding the bushing with the crown 47 out of the main sleeve 1. The bushing with the crown 47 together with its structural elements, in particular crown teeth form a socket unit of the coupling mechanism, which the bushing with the crown 47 has a profile configured respectively for cooperation with the catches 48a of the latching sleeve 48, or in another variant of the ring 48 with the locking protrusions 48a, wherein the latching sleeve 48 with the catches 48a, and in another variant the ring 48 with the locking protrusions are structural components of the plug unit of the locking mechanism, while the protrusions of the pusher 53 form the auxiliary components of the plug unit of the locking mechanism. The sleeve crown with the crown 47 has a structure generally similar to that shown in FIG. 2d with respect to the crown 28 in embodiment of FIG. 2a, b and a flowchart diagram shown in FIG. 2e refers to the flowchart diagram of the sleeve with the crown 47 as well. The latching sleeve 48 is mounted within the body 9 and it is locked against a sliding movement by a shoulder surface provided on the inner surface of the body 9 on the one side and the closure sleeve 4 on the other side.

The locking mechanism further comprises a positioning pin 56 which determines the correct angular positioning of the protrusions of the pusher 53 and the locking protrusions 48a of the latching sleeve 48 in relation to the teeth 47a of the sleeve with the crown 47.

Between the main sleeve 1 and the closure sleeve 4, as was mentioned previously, the sealing, in a preferred embodiment in the form of a sealing diaphragm 3, preferably a rolling diaphragm 3 and also a helical spring 5 of the push-button 2 are arranged. The rolling diaphragm 3 is forcedly fitted at one its side in the recess of the closure sleeve 4, and at the opposite side in a groove formed in the main sleeve 1, while the push-button 2 is non-displaceably mounted on the main sleeve 1, on the outlet end 11 side thereof (as shown in FIG. 3a, b).

The device in this embodiment according to the invention operates in such a way that the flow from the inlet to the outlet is opened by pressing and axially moving the push-button 2 towards the inlet, that button is non-displaceably mounted on the main sleeve 1, which pressing causes moving the main sleeve 1 in the same direction, up to sliding out of its outflow openings/outflow opening 1a beyond the closure sleeve 4 from the position sealed by the gasket 6 and the rolling diaphragm 3, and thereby opening fluid communication between the inner space of the body 9 and the inner opening of the main sleeve 1, and thereby also between the liquid inlet 10 and the outlet of the device. Locking of the main sleeve 1 in the open flow position is realized by its triangularly shaped protrusions of the pusher 53, pushing the sleeve with the crown 47, slidably and rotatably mounted on the main sleeve 1, to a position remote from the closure sleeve 4, whereby in this position the sleeve with the crown 47 in cooperation with the latching protrusion 48a of the latching sleeve 48, or in another variant, with the locking protrusion of the ring 48, maintains the main sleeve in this position, allowing the free flow of the liquid between the inlet and the outlet. After next pressing the push-button 2, as a result of pressure exerted by the oblique surfaces of the pusher 53 on an oblique surface of the teeth 47a of the sleeve with the crown 47, firstly the sleeve with the crown 47 is slid away from the latching protrusion 48a of the latching sleeve 48, and then the sleeve with the crown 47 is rotated by an angle corresponding approximately or equal to half of the MP pitch of spacing of the teeth 47a of the sleeve with the crown 47, said indexing module is the distance between two adjacent teeth 47a, similarly as shown in FIG. 2e with respect to the crown 28.

The locking mechanism operates in such a way that after releasing the pressure on the push-button 2 the sleeve with the crown 47 pulled by the main sleeve 1 via a fixing element, preferably a screw 51, located at its inlet end 12, returns to the rest position, wherein the outflow openings 1a are closed by the closure sleeve 4, its shorter, oblique surface allows a small rotation of about ½ of the pitch in order to allow the catch or the latching protrusion 48a of the latching sleeve 48 to engage the slot of the teeth 47a in the sleeve with the crown 47. The spring 5 by pressing via the push-button 2 onto the main sleeve 1 causes a movement of the main sleeve 1 in the direction towards the outlet (in FIG. 3b to the left) and closing of the outflow openings 1a inside the closure sleeve 4. The movement is stopped after abutment of the gasket 6 against the closure sleeve 4. The abutment of the gasket 6 against the closure sleeve 4 causes sealing the outflow openings 1a and stopping the flow.

Figure 4A:
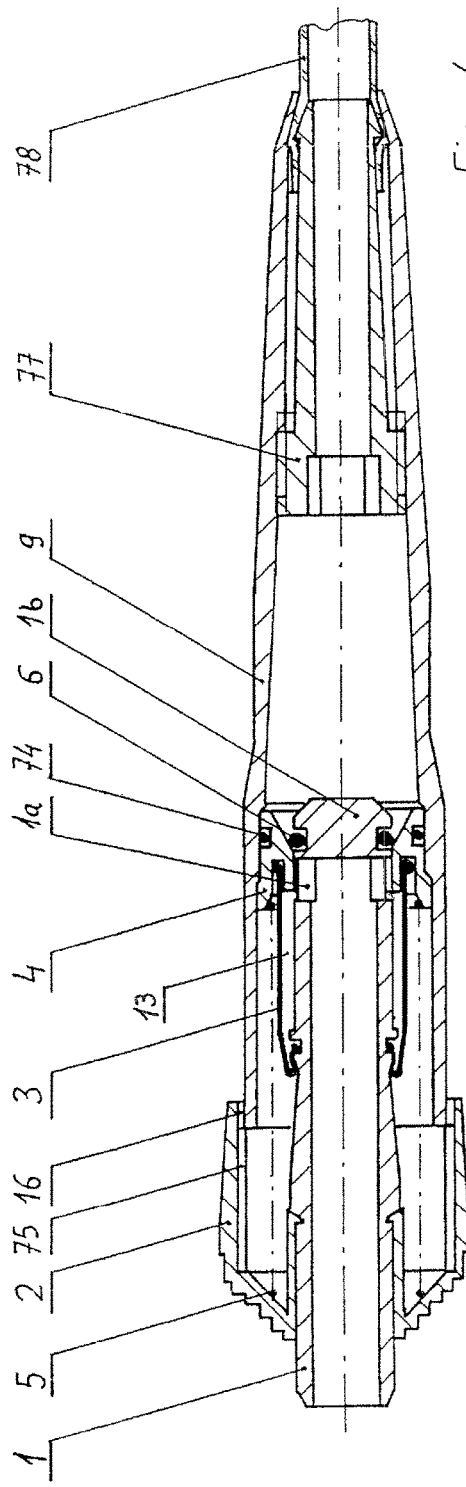
Figure 4B:
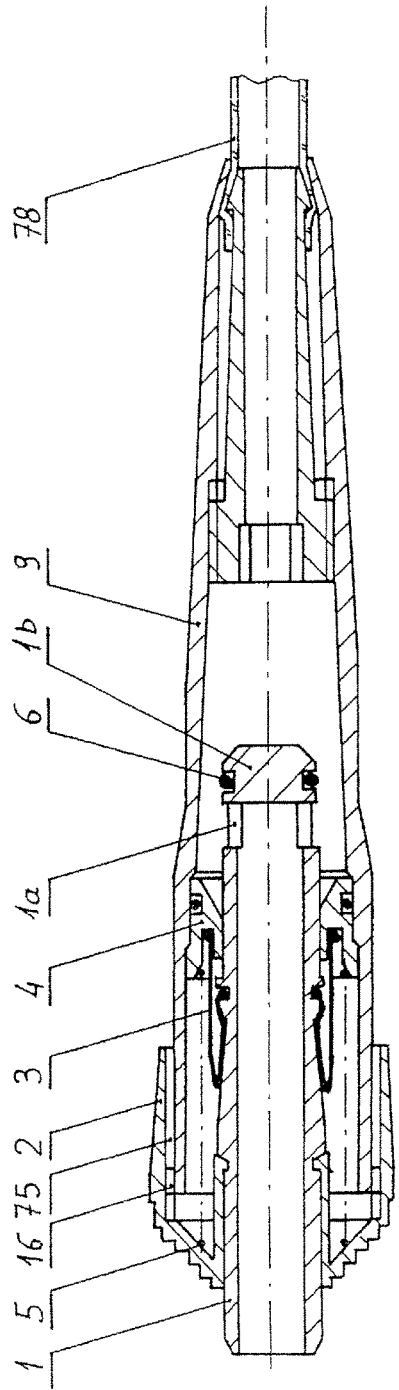

FIG. 4a, b show next, the fourth embodiment of the pouring device according to the invention, wherein a compact arrangement of the device is presented, for use at low pressures, below 1 bar, and in particular for disposable uses or of the expected short term using, especially in the case where a low price criterion is important. In this embodiment, the push-button 2 is connected non-displaceably, in snapped way, to the main sleeve 1, the inlet end 12 of which, closed by means of the closure element 1b, is located with slight clearance 13 within the closure sleeve 4. There is provided a gasket 6 abutting against the inner conical surface of the closure sleeve 4, which simultaneously closes the flow through the outflow openings 1a and does not allow for the movement of the main sleeve in the opposite direction, i.e. away from the device body 9. The closure sleeve 4 is forcedly fitted inside the device body 9, and in addition there is provided a gasket 74 of the device body, which prevents leakages while maintaining immovable position of the closure sleeve 4 inside the device body 9. The flexible feeding hose 78 is pushed onto the connector pipe 77, which is screwed inside the device body 9. Pressing the flexible hose 78 against the wall of the body 9 results in a sealing of the whole assembly.

The device in this embodiment is also equipped with a locking mechanism for locking the device in the open flow position, wherein in this embodiment, there is provided the locking mechanism in the form of the cam-slider coupling mechanism, which mechanism includes a recess, being a guiding cam mechanism, locking the position of the main sleeve 1, preferably in the form of a cardioid cam with a shaped groove 75 having the cardioid shape, which groove 75 functions partially as the guiding groove 15 in such a way that it comprises a portion constituting the guiding groove 15. The locking function of the device in the open flow position is carried out by means of a recess, preferably in the said form of a cardioid groove 75. Said locking recess, preferably the cardioid groove 75, in this embodiment is arranged on the inner cylindrical surface of the push-button 2, and with the cardioid groove cooperates the guiding protrusion 16 located on the outer surface of the device body 9. In the simplest variant, a guiding protrusion 16 travels along the section 15 of the cardioid groove 75, causing alternately the locking of the push-button 2 and the associated main sleeve 1 in the open flow position, in which the outflow openings 1*a* of the main sleeve 1 protrudes beyond the closure sleeve 4, or releasing the lock of the main sleeve 1 and returning movement of the latter back to the closed flow position, in which the gasket 6 abuts against the inner conical surface of the closure sleeve 4. Such a structure can cause adverse torsion of the rolling diaphragm 3, the maximum torsion of which should not exceed 3 degrees, so it can be used only if the ratio of the circumference of the inner cylindrical portion of the push-button 2 to the width of the guiding protrusion 16 is greater than 120, for example while the diameter of the inner part of the push-button 2 is of 25 mm the width of the guiding protrusion 16 should not be greater than 0.65 mm.

Figure 4C:
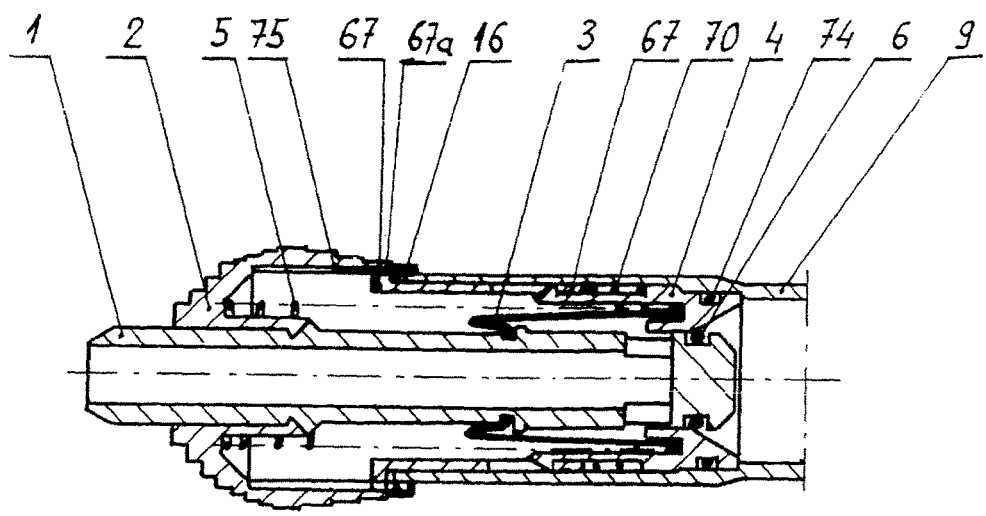

To avoid the problem caused by torsion of the rolling diaphragm 3 it is preferable to use in the variant of the solution of the locking mechanism shown in FIG. 4*a*, *b*, in addition the sleeve 67 with the slider 67*a* and the recess in the form of a window 67*b*, as shown in a fifth embodiment in FIG. 4*c*,*d*, whereas the sleeve 67 is disposed with a play inside the body 9 and having possibility of rotation as well as linear displacement, wherein that displacement is restricted by the window 67*b* in the sleeve 67 with the slider 67*a*, cooperating with the catch 4*a* being a part of the closure sleeve 4 marked in FIG. 4*e*. In such construction, the sleeve 67 with the slider 67*a* perform rotation, whereas the guiding protrusion 16, preferably having a larger dimension in the height direction, i.e. being higher than the slider 67*a*, arrests the push-button 2 in the position in which it is able to move by shifting but it cannot rotate, since the guiding protrusion 16 arrests the push-button 2 against the rotation.

The operation of the device in the fifth embodiment is as follows, the slider 67*a* of the sleeve 67 with the slider moves along the cardioid groove 75, at the end of which the oblique side of the groove causes a slight rotation of the sleeve 67 with the slider, and releasing of the push-button 2 results in an abutment of the slider 67*a* against the opposite side of the cardioid groove 75, as well as its continued slight rotation up to stabilization in the groove, thus causing locking the main sleeve 1 in the open position, while the guiding protrusion 16 prevents turning torsion of the push-button 2 and the main sleeve 1. To ensure reliable operation of the mechanism it is preferred that the straight part of the groove 75 is deeper than the rest of its profile, and the guiding protrusion 16 is higher than the slider 67*a*. After pressing again the push-button 2, as a result of the pressure of the oblique side of the cardioid groove 75 against the slider 67*a* the sleeve 67 with the slider is further turned around and the button 2 is thus allowed to return to the rest position together with tight closing of the outflow openings 1*a* of the main sleeve 1 by the gasket 6 that is pressed against the closure sleeve 4. To increase a comfort it is recommended to use a spring 70, pushing the sleeve 67 with the slider away from the guiding protrusion 16.

To facilitate the assembling, the sleeve 67 with the slider 67*a* may be composed of two parts, as shown in FIG. 4*e*.

Figure 4D:
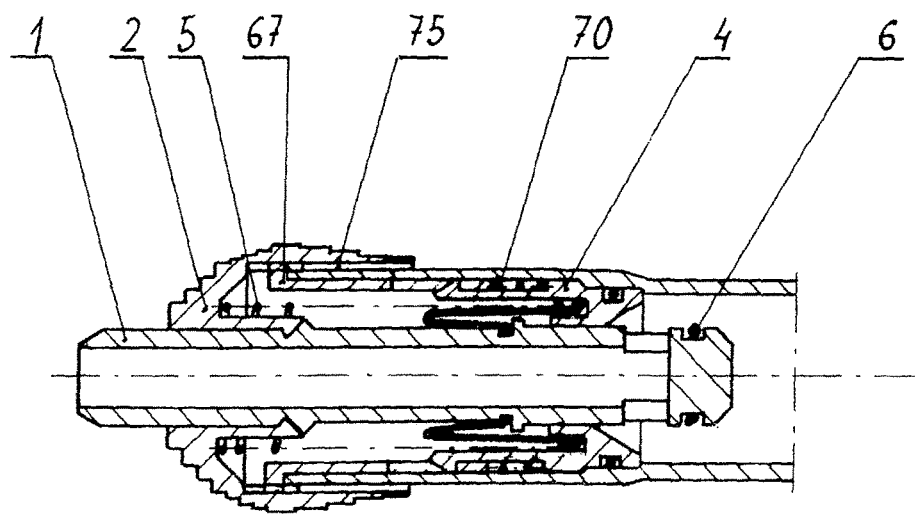
Figure 4F:
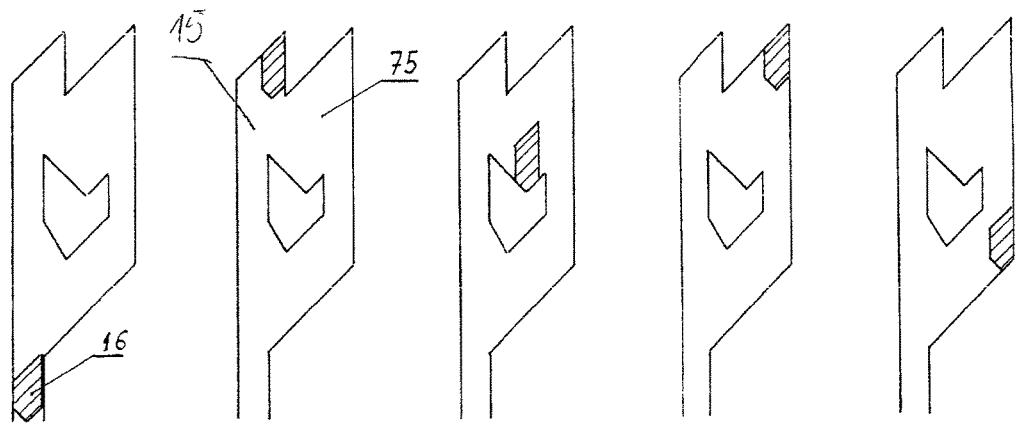
Figure 4G:
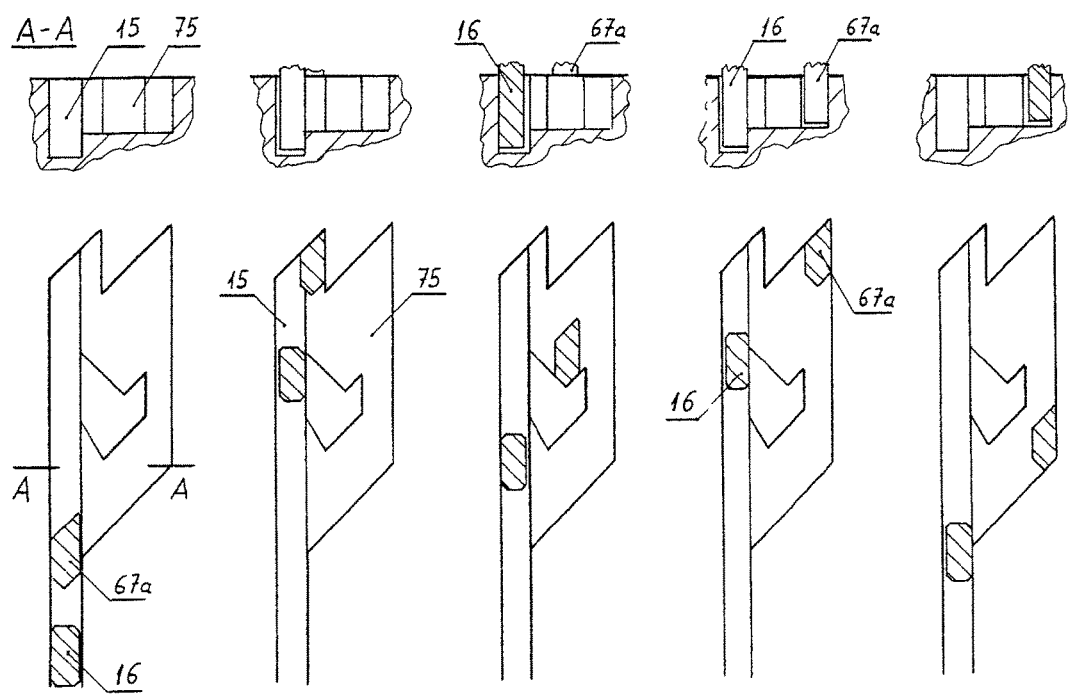

FIG. 4*f* shows the successive phases of the cooperation of the guiding protrusion 16 with the cardioid groove 75, and FIG. 4*g* shows successive phases of the cooperation of the slider 67*a* of the sleeve 67 with the slider with the cardioid groove 75 and the guiding protrusion 16 with the part 15 of the cardioid groove 75.

Figure 5A:
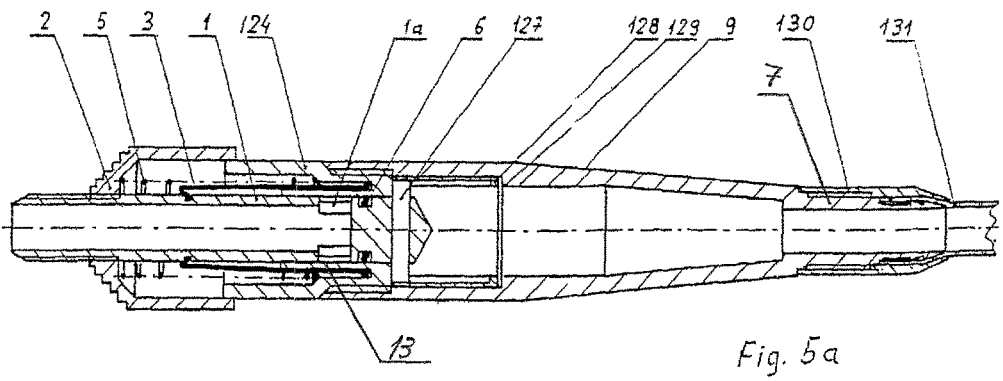
Figure 5B:
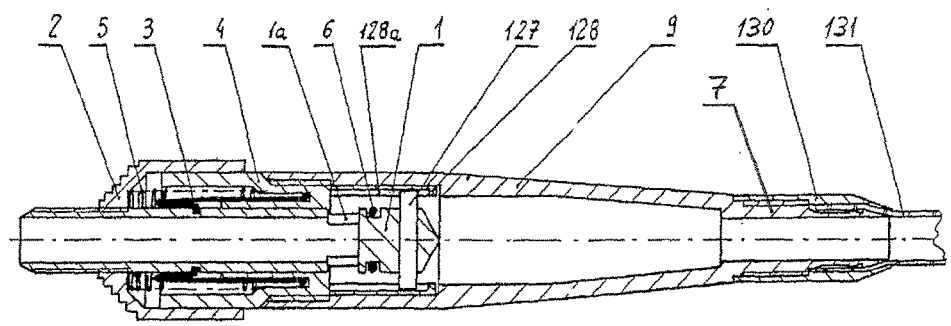

FIG. 5*a, b* show a further, sixth embodiment of the device according to the invention, which is similar to the embodiment shown in FIGS. 4*c* and 4*d*, however, with the different locking mechanism, which is also a cam-slider type mechanism, as in the previous embodiment of the pouring device and that comprises a slider 127 which is mounted on the main sleeve 1 and the guiding element forming a cam part, is in the form of the sleeve 128 with the shaped groove 128*a*, in particular in the cardioid shape 128*a*, and said sleeve is arranged with a slight clearance 13 within the body 9 and is locked against displacement by means of the protrusion 129 of the device body 9 at one side and by means of the closure sleeve 4 at the other side. Elastic feeding hose 131 is pressed on a suitably shaped inlet tip 7 of the body 9 and tightened with the clamping nut 130. Similarly as in the embodiment shown in FIG. 4*c, d*, locking of the open flow position of the device, where the outflow openings 1*a* of the main sleeve are shifted out beyond the closure sleeve 4 is carried out by the movement of the slider 127, which is a guided element of the locking mechanism, in the shaped groove 128*a* having a cardioid shape, said movement is caused by pressing and axially shifting the push-button 2 in the direction towards the inlet of the device, whereas releasing of the lock takes place after next pressing of the push-button 2 in the same direction and, thus caused the displacement of the slider 127 within the cardioid groove 128*a*, forming the guiding element of the locking mechanism, and the resulting return movement of the main sleeve 1 to the sealed position of its outflow openings 1*a*.

The working of the device in this embodiment is similar as in the case of the previously described embodiment, the difference is in that the sleeve 128 with the cardioid groove 128*a* is a separate element rotatably and non-displaceably secured within the device body 9. The slider 127 is mounted in the main sleeve 1 and its sliding along the cardioid groove 128*a* forces alternately: stopping the main sleeve 1 in the open flow position and allowing the flow without the need of continuous pressing on the push-button (FIG. 5*b*) or releasing of the main sleeve 1 to allow the closing off the flow (FIG. 5*a*).

Figure 6C:
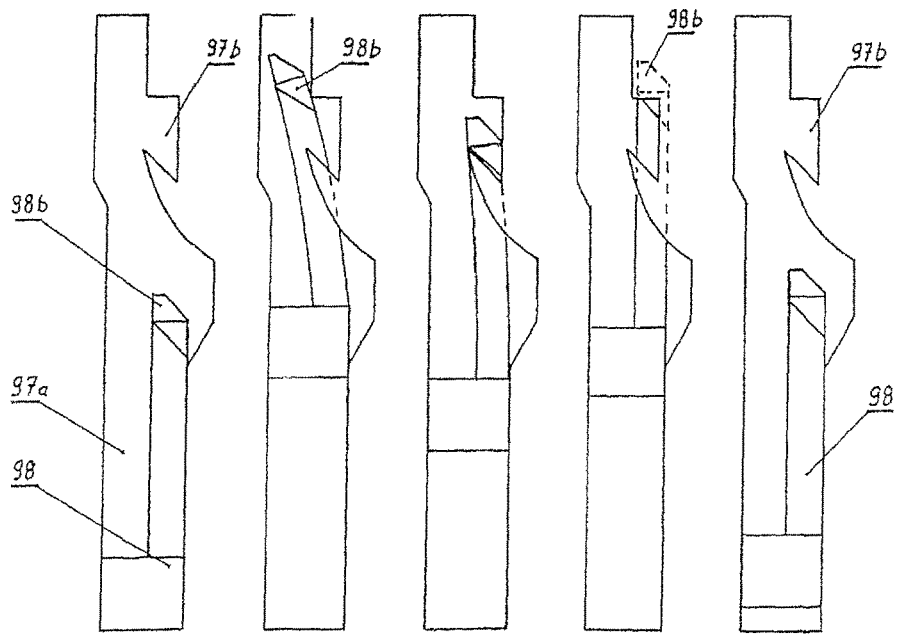
Figure 6A:
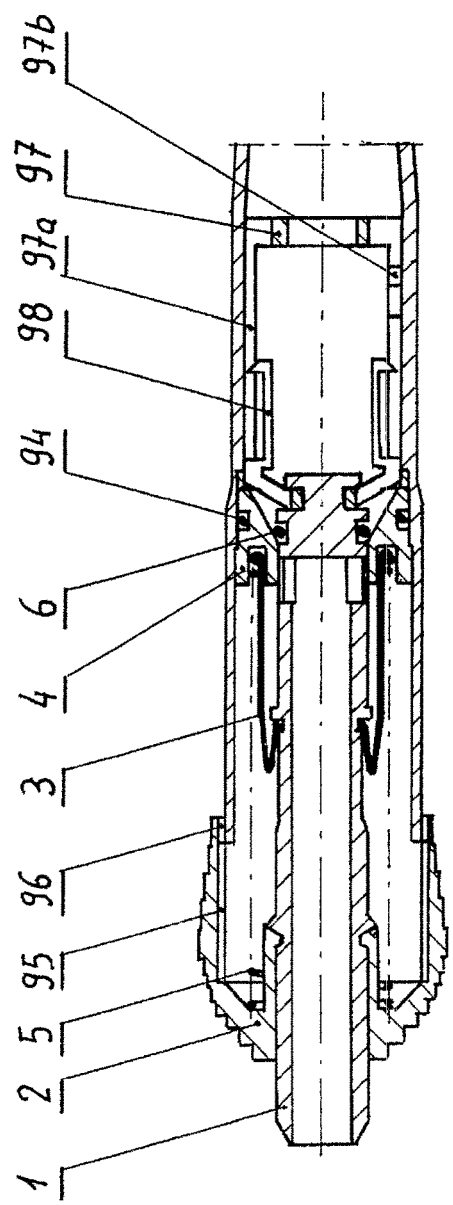
Figure 6B:
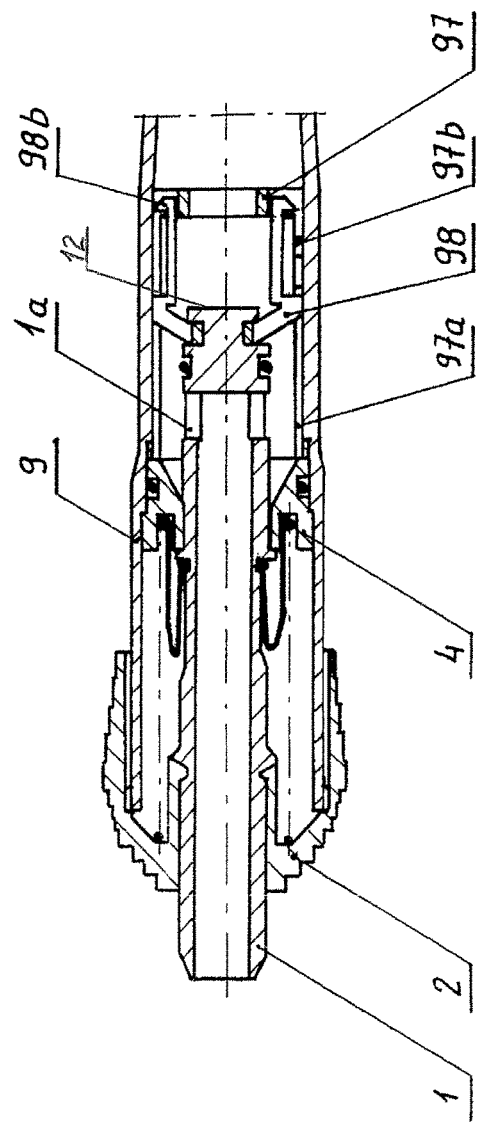

FIG. 6*a, b* shows further, the seventh embodiment of the pouring device according to the invention with a locking mechanism of the cam-slider type comprising modified, in relation to the above-described embodiments, cam element in the form of the shaped groove, that functions similarly to a cardioid groove as described above, with the provision that by using the elastic element its operation takes place in three dimensions, rather than in two dimensions as for the cardioid groove in the previous embodiments, wherein the structure of the device in this embodiment is generally similar to the embodiment shown in FIG. 5*a, b* with the difference in that the modified arrangement of the locking mechanism is used. The locking mechanism in this embodiment comprises a locking sleeve 97 in which a shaped groove 97*a* is formed, which is the guiding member of the locking mechanism constituting the modification of the cardioid groove, and which is cam part of the cam-slider coupling mechanism, as described in previous embodiments, and illustrated in more detail in FIG. 6c, which the shaped groove 97a is formed by a shaped recess in the locking sleeve 97, wherein the locking sleeve 97 is mounted inside and within the body 9, between the closure sleeve 4 and the inlet end 12 of the body 9. In this case, the recess forming a shaped groove 97a is preferably a pass-through-recess—passes through the whole thickness of the wall of the sleeve, which facilitates the manufacture of the device, but it may be also in the form of a blind recess, i.e. extending only on a portion of the wall thickness of the sleeve 97. The locking mechanism also comprises a spring latch with the resilient member 98, which is a modified slider part of the locking mechanism, and which has a convex (or protruding) part 98b with four co-operating planes, namely: 1. A front plane inclined so as to allow pressing it under the surface of the wall of the sleeve 97; 2. A slanted front plane arranged in a way allowing its tilting in the plane perpendicular to the axis; 3. An inclined rear plane—enabling engagement in the recess 97b of the shaped groove 97a, 4. A flat plane allowing for a movement under the surface of the wall of the sleeve 97. This special shape allows deflection in two dimensions: laterally perpendicular to the axis of the sleeve 97 and radially—in the direction of the axis of the sleeve 97, and which cooperates with the shaped groove 97a to lock the open flow position of the device. The resilient member 98 of the latch is mounted at one its side in the circumferential groove of the closure member 1b of the main sleeve 1, and with the other end it enters into the shaped groove 97a in the locking sleeve 97 to form a spring latch. FIG. 6c shows the movement of the resilient element in successive working phases of the device during pressing the push-button 2, attached non-displaceably to the main sleeve 1. The resilient member 98 of the latch, forming the guided member of the locking mechanism, moves along the shaped recess 97a, preferably shaped groove 97a constituting the guiding element of the locking mechanism. In the first phase the wall of the recess deflects it sideways i.e. to the side. After releasing of the push-button 2 a convex portion 98b of the resilient member 98 falls into said specific shaped recess 97b in the form of the shaped groove, that stops it there, and thus stops the main sleeve 1 in an open flow position. Next pressing of the button 2 results in a pushing the protruded part 98b of the resilient member 98, which forms the guided slider element of the locking mechanism, under the wall of the locking sleeve 97. The latch member 98 straightens and slides next to the shaped recess 97b, but still inside the locking sleeve 97. This allows returning of the main sleeve 1 under influence of the spring 5 to the rest position, i.e. position in which the gasket 6 bears against the conical inner surface of the closure sleeve 4 and closes the flow through the outflow openings 1a.

Figure 7A:
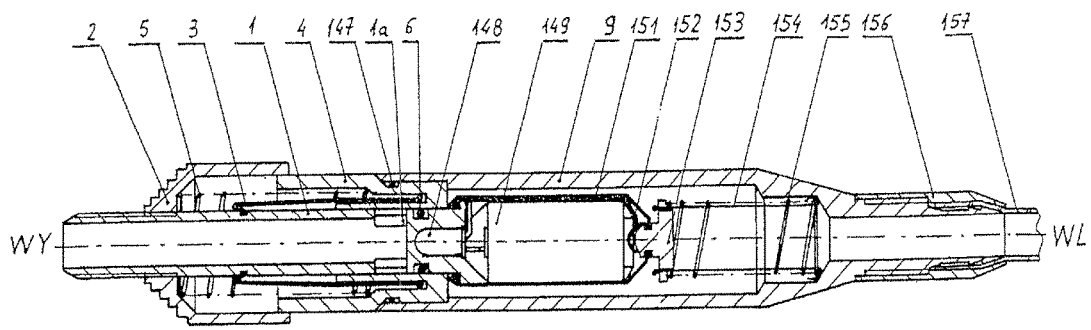
Figure 7B:
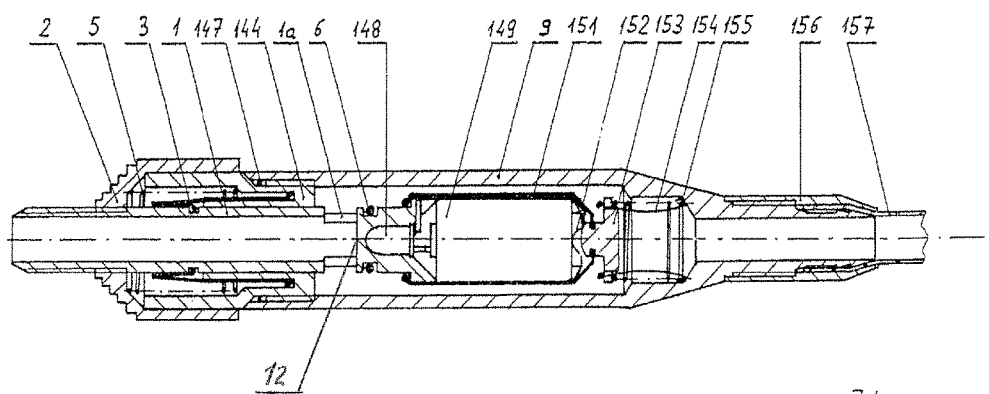

In further next, the eighth embodiment of the invention shown in FIG. 7a, 7b, which is structurally very similar to the embodiment shown in FIG. 1a, b, because it contains neither locking, nor positioning mechanism but, of course, in this embodiment the locking mechanism according to one or more embodiments of the device of the invention presented in the foregoing portion of the present description can also be used. In this embodiment of the device, at the side of the inlet end 12 of the main sleeve 1 facing towards the inlet and closed by the closing element 1b in the closing element the lighting element 148 is arranged, preferably a LED 148, connected to a power supply battery 149, while in the device body 9 a resilient contact 152 is accommodated, having a pusher 153 biasing the pusher spring 155 towards the inlet of the device during forward movement of the main sleeve 1 beyond the closure sleeve 4 under the influence of axial pressure on the push-button 2 from the sealed position of its outflow openings 1a sealed by the gasket 6 and the rolling diaphragm 3, after pushing the button 2 towards the inlet. Pressing the button 2 causes firstly opening of the flow between inlet WL of the body 9 and outlet WL of the main sleeve 1 through the outflow openings 1a, and secondly it causes simultaneously biasing the resilient contact 152 against the battery 149 and closing the electric circuit, and thus the emission of light from the LED 148, wherein the light beam is conducted by a stream of liquid flowing out from the outlet and it illuminates the place to which the liquid flows, for example to the filled up container. A prerequisite condition in this case is the use of a liquid transparent to LED light. After releasing the push-button 2 the main sleeve 1 is moved back under the action of the spring 5 of the button 2 towards the outlet, thus closing the fluid communication and liquid outflow and at the same time it causes releasing of the pressure on the resilient contact 152 and opening of the electrical circuit of the LED 148. To open the circuit in the proper position a tie bar 154 of the spring of the pusher can be additionally provided, which pulls the pusher 153 away from the resilient contact 152. The battery 149 is protected against contact with the filled liquid through the gasket 151 of the battery. To ensure long-term operation of the device it is preferably to use the battery with a long lifetime, e.g. ER 14250 (3.6 V, 1200 mAh, the lifetime above 10 years).

The structure of the pouring device according to the invention presented in this embodiment makes it possible to improve the functionality of the device thanks to additional illumination of the fluid stream at the time of its outflow. It has both aesthetic application—a backlight of the water stream disintegrating into individual droplets gives a fantastic visual effect, and a practical one, for example during filling up the liquid into the tank or container in the absence of a proper illumination making impossible to check the level of the liquid in the tank. To obtain the described effect the liquid have to be transparent.

The embodiments of the invention presented in the present description are not limiting and according to the invention they can be combined in any way with each other and used as any combination of solutions and configurations of the variants of embodiments of the invention shown in the description, according to an idea set forth in the appended claims.

The invention claimed is:

1. A pouring device for filling or discharging of a liquid comprising:
    an elongated body, having one end terminated by a tip having a liquid inlet for the pouring device;
    a closure sleeve, which is arranged co-axially with respect to said elongated body, is mounted axially on a main sleeve, in such a way that
    said closure sleeve surrounds the main sleeve with a clearance, wherein the main sleeve is slidable relative to the closure sleeve and the elongated body and said main sleeve comprises an outlet end remote from the elongated body and an inlet end directed to the elongated body facing towards said liquid inlet of the pouring device, wherein said inlet end of the main sleeve has an inlet end side surface with at least one outflow opening and, further, said main sleeve has a circumferential gasket groove on a main sleeve side surface that receives a gasket; and a push-button for activating and shutting off the liquid flowing from the outlet end of the pouring device, characterized in that the push-button is located on the main sleeve at said outlet end, wherein said push-button is non-rotatably mounted thereon, and a seal and a helical spring are arranged between the main sleeve and the closure sleeve, wherein the pouring device is transposed to an open flow position by exerting pressure on the push-button applied in the axial direction from the outlet end in the direction towards the liquid inlet of the pouring device and the axial displacement of said push-button together with the main sleeve towards the liquid inlet to a position, in which the at least one outflow opening is slid away beyond the closure sleeve and the gasket, wherein, after releasing pressure on the push-button, the main sleeve, and thus the pouring device, automatically returns to a closed flow position as a result of a return movement of the main sleeve to a sealed condition by the gasket in the closure sleeve under the action of the helical spring.

2. The pouring device for filling or discharging of a liquid according to claim 1, characterized in that protection is provided against rotation of the push-button with respect to the elongated body, the closure sleeve and the gasket, due to the cooperation of a guiding protrusion located on a surface of the closure sleeve or the elongated body and a guiding groove disposed on the push-button.

3. The pouring device for filling or discharging of a liquid according to claim 1, characterized in that a locking mechanism for locking of the pouring device in the open flow position from the liquid inlet towards the liquid outlet of the pouring device is provided, wherein the locking mechanism is in the form of a plug-socket coupling mechanism with a plug unit and a socket unit, wherein said plug and socket units are respectively provided with locking protrusions or teeth, which are adapted in shape to cooperate with each other, and which are arranged respectively on each of the corresponding plug and socket units, wherein the socket unit includes a crown with the teeth, and the plug unit includes locking latches or protrusions, forming either structural components, or auxiliary elements of the unit, or alternatively the locking mechanism is in the form of a cam-slider coupling mechanism which is provided with a cam guiding element in the form of a recess or a shaped groove and a guided element in the form of a slider or a resilient member, both being adapted in shape for cooperation with the guiding element.

4. The pouring device for filling or discharging a liquid according to claim 1, characterized in that a locking mechanism in the form of a plug-socket coupling mechanism comprises a plug unit and a socket unit, said plug unit having a latching sleeve with a locking protrusion in the form of one or more structural elements selected from:

latching protrusions of the latching sleeve;

a latching protrusion of the latching sleeve;

toothlike protrusions of the push-button or said push-button having a tooth flange and/or pusher protrusions; or a toothed flange of the main sleeve, and cooperating with the plug unit;

the socket unit having toothlike parts or teeth, wherein the socket unit includes a crown provided with protrusions in the form of crown teeth or toothlike portions of the crown, which are adapted to cooperate as well as adapted in shape and dimensions for entering into locking engagement with the respective latching protrusions and with toothed protrusions and/or protrusions of a pusher as auxiliary elements of the plug unit.

5. The pouring device for filling or discharging of a liquid according to claim 4, wherein said auxiliary elements are in the form of auxiliary toothlike protrusions that are arranged on an inner surface of the push-button or in the form of auxiliary pusher protrusions arranged on the main sleeve.

6. The pouring device for filling or discharging a liquid according to claim 1, characterized in that said push-button comprises a guiding groove arranged on an inner side surface of the push-button which cooperates with a guiding protrusion disposed on either an outer surface of the elongated body or of the closure sleeve connected with the elongated body wherein said guiding protrusion has a width smaller than the width of the guiding groove.

7. The pouring device for filling or discharging a liquid according to claim 1, characterized in that a ratio of an inner circumferential dimension of a cylindrical portion of the push-button to a width of a guiding protrusion on said closure sleeve is greater than 40.

8. The pouring device for filling or discharging of a liquid according to claim 7, wherein said width is greater than 120.

9. The pouring device for filling or discharging a liquid according to claim 1, characterized in that a lighting element is provided at the side of the inlet end of the main sleeve which is directed to the liquid inlet, wherein said lighting element is connected to a supplying battery, while in the elongated body a resilient contact is placed with a pusher, biasing the helical spring in the direction towards the liquid inlet when the main sleeve is moved by sliding outside from the closure sleeve after pressing the push-button in the direction towards the liquid inlet and opening the liquid outflow between the liquid inlet of the device and the outlet of the main sleeve, wherein a pusher causes simultaneous pressing of the resilient contact against the battery and closes an electric circuit switching on light emission by the lighting element, wherein a light beam is guided by the liquid outflow and illuminates a place to which the liquid flows.

10. The pouring device for filling or discharging of a liquid according to claim 9, wherein said lighting element is a LED.

11. The pouring device for filling or discharging of a liquid according to claim 1, wherein said elongated body is cylindrical.

12. The pouring device for filling or discharging of a liquid according to claim 1, wherein said inlet end has at least two outflow openings.

13. The pouring device for filling or discharging of a liquid according to claim 1, wherein the gasket is a rolling diaphragm.

* * * * *